May 18, 1948. O. E. WIDÉN 2,441,861
METHODS OF REMOVING THE NON-DESIRABLE TASTE-IMPAIRING
ORGANIC SUBSTANCES CONTAINED IN COCOA BERRY
Filed Feb. 20, 1941 2 Sheets-Sheet 2
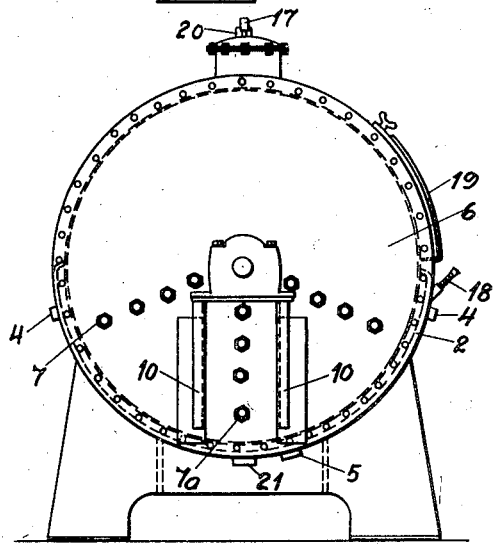
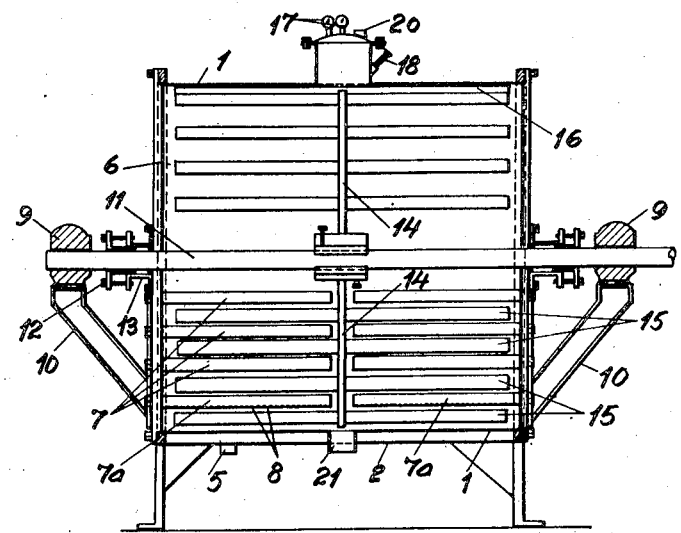
Inventor:
Olof Edwin Widén
By Young, Emery & Thompson
Attorneys Patented May 18, 1948

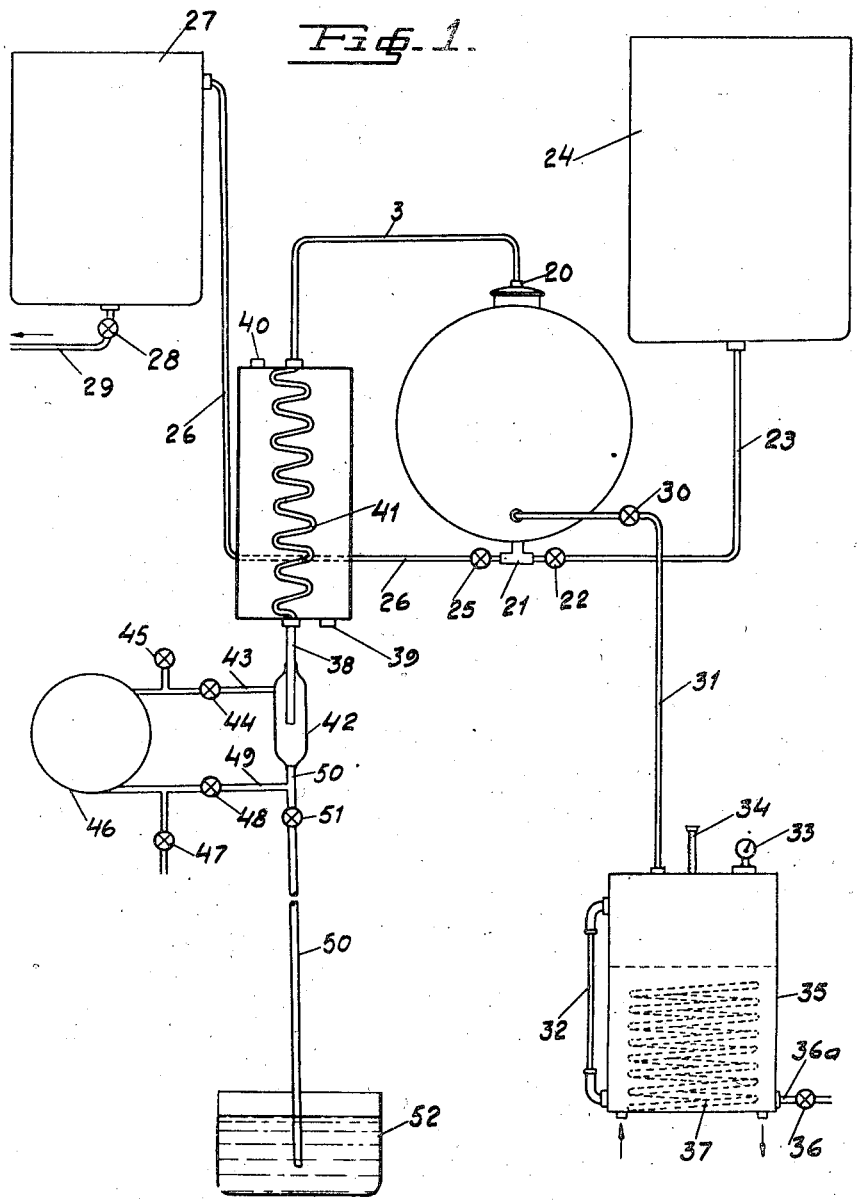

2,441,861

UNITED STATES PATENT OFFICE 2,441,861

METHOD OF REMOVING THE NONDESIRABLE TASTE-IMPAIRING ORGANIC SUBSTANCES CONTAINED IN COCOA BERRIES

Olof Edwin Widén, Ljungsbro, Sweden

Application February 20, 1941, Serial No. 379,898
In Sweden March 4, 1940

Section 3, Public Law 690, August 8, 1946
Patent expires March 4, 1960

8 Claims. (Cl. 99—23)

It is previously known to remove the non-desirable, taste-impairing organic substances contained in the cocoa berry by conching. This conching takes place after the cocoa has been admixed with sugar and dry-milk, if desired, that is to say, the chocolate mass would, simultaneously with the mixing thereof, be relieved of said substances through the influence of air. However, this method has proved to be very tedious and troublesome. Endeavors have been made previously to accelerate the procedure by blowing air through the mass. This procedure, however, also would not yield entirely satisfactory results.

The present invention refers to a method, by means of which said substances may be removed rapidly and effectively from the cocoa mass, that is to say, the treatment takes place prior to the admixture of sugar and milk. According to the invention, this is effected by blowing superheated steam of a pressure below atmospheric through the substantially non-mixed cocoa at the supply of heat. Preferably, the cocoa is evacuated, before the steam is admitted.

It has been found in practical experiments that the cocoa treated in this way would attain a considerably improved character, and that this holds also true in regard to the fat obtained by pressing the mass produced in accordance with the method in question.

Furthermore, by subjecting the cocoa to treatment in this manner, the subsequent conching is facilitated, which will only have to proceed until the chocolate mass has been rendered homogeneous.

In the treatment, the cocoa may either be in the form of a liquid mass or in a solid state, for instance in the form of coarse grains.

The temperature of the cocoa in the treatment may be between 30–130 degrees centigrade. It has been found, however, that a temperature of about 70–80 degrees centigrade yields an exceedingly satisfactory result. The pressure below atmospheric should be 600–760 millimeters.

The cocoa is preferably subjected to powerful stirring during the treatment, so that a large contact surface is produced between the medium and the cocoa mass.

When cocoa in the form of a liquid mass is being treated, it is preferably conveyed in the form of a thin layer or film in the path of the superheated steam.

Together with steam, ammonia gas and air may also be blown through the cocoa, or, one of these gases or a mixture of two or all three of them may be brought into use.

The invention also refers to an apparatus for carrying the method into effect, said apparatus being particularly suitable in applying the method in question to liquid cocoa mass. According to the invention, the apparatus comprises a cylindrical receptacle which is closed at the ends thereof, and in which is rotatably mounted a shaft carrying a number of arms extending at right angles thereto, said arms carrying, in turn, stirring arms parallelling the shaft, which latter arms are adapted to cooperate with rigid arms secured in the head plates of the receptacle, the upper portion of the receptacle having one or more suction openings provided therein, while openings for the steam, the ammonia gas and/or the air are provided near the bottom of the receptacle. These openings are preferably arranged in some of the rigidly secured arms, for instance in those adjacent to the bottom of the receptacle. The receptacle may be provided with a suction opening for the cocoa mass, so that when the same is placed under vacuum, the mass will be sucked through a pipe conduit from a store container for the non-treated mass. The receptacle is also provided with a tapping opening. These openings may be joined to a common opening, the pipe conduits being then provided with suitably arranged cocks. To facilitate the tapping of the mass from the receptacle, the latter may also be arranged to be placed under a pressure above atmospheric, so that the mass may be pressed over into a store container for the treated mass.

A form of embodiment of the invention is illustrated in the accompanying drawings. Fig. 1 shows a plant for carrying the method into effect. Figs. 2 and 3 show the receptacle proper to a somewhat larger scale and viewed from the end and in a longitudinal section respectively.

1 designates the cylindrical casing of the receptacle and 2 an external casing extending from the bottom and upwardly half-way the height of the receptacle. In the use of the apparatus, steam or hot water intended for the heating of the cocoa mass is introduced into the space between the two casings, such steam or hot water being led in and off through sockets 4 and 5 respectively. Screwed into the head walls 6 of the receptacle are a number of arms 7, the embodiment shown having three groups of arms comprising four arms each, out of which the two lower arms 7a are hollow and provided with downwardly located openings 8 for the steam ammonia gas and air. A shaft 11 extending through the receptacle is mounted in bearings 9 on supporting arms 10 at the center of the head walls 6, said shaft being provided at its entrance into the receptacle with stuffing boxes 13. In the embodiment shown, four arms 14 are secured to the shaft 11, said arms carrying stirring arms 16 parallelling the shaft 11. According to the drawing, each arm 14 has four stirring arms 15 secured thereto, said stirring arm entering the intermediate spaces between the arms 7. One of the outer arms is provided with a scraper 16, which is adapted during operation continuously to scrape off chocolate mass that would otherwise burn fast to the cylinder wall. The receptacle is provided in known manner with non-return valves combined with meters 17 for pressures above and below atmospheric, and is also fitted with thermometers 18 to indicate the internal temperature of the receptacle as well as the temperature of the steam or water, there being also provided a door 19 to facilitate access to the interior of the receptacle. In its upper part the receptacle is provided with a socket 20 through which air may be sucked out and pressed in respectively. Provided at the bottom of the receptacle is a socket 21 for the cocoa mass. This socket communicates, through a pipe conduit 23 adapted to be closed by means of a valve, with a store container 24 for the untreated mass of cocoa, this latter container being heated to such a temperature as to keep the cocoa mass in a liquid state. The socket 21 is also connected to a store container 27 for the treated mass through a conduit 26 adapted to be closed by means of a valve 25. The store container 27 is provided with a tapping conduit 29 adapted to be closed by means of a valve 28. The arms 7a are connected, through a pipe conduit 31 adapted to be closed by means of a valve 30, with a closed water container 35 provided with a water-gauge 32, a meter 33 for measuring the pressure below atmospheric, and a thermometer 34, said container communicating with a water conduit through a pipe conduit 36 adapted to be cut off by means of a valve 36. A serpentine coil 37 for steam or hot water is inserted into the water container 35, which may also be arranged for automatic feeding of water into the same, such feed being controlled by means of a float. Connected to the socket 20 is a pipe conduit 3 which, on having passed through a condenser 41 provided with an inlet and an outlet socket 39 and 40 respectively for cooling liquid extends for a distance into the box 42. Connected to this box is a pipe conduit 43 which is provided with a cut-off valve 44 and a suction valve 45 while being connected to the vacuum side of a double-acting pump 46. Connected to the pressure side of this pump is a pipe conduit 49 provided with an exhaust valve 47 and a cut-off valve 48, said pipe conduit 49 being connected to a pipe conduit 50 extending downwardly from the box so far that water rising into the same at vacuum cannot penetrate into the pipe conduit 49. The pipe conduit 50 is provided at the upper end thereof with a cut-off valve 51, and opens at its lower end into an open container 52.

Before the treatment of the cocoa commences, the treating receptacle and the mass in the store container 24 are heated to a suitable temperature, such as 80 degrees centigrade, while the water in the container 35 is heated to a somewhat lower temperature, such as 60 degrees centigrade. After that, the valves 22, 44, 47 and 51 are opened, while the remaining valves are kept closed, whereupon the pump 46 is started and the shaft is brought into rotation at the same time. Now, when the mass is sucked into the receptacle through the pipe 23 so as to fill the receptacle half-way up, the valve 22 is closed while, the desired vacuum having been reached, the valve 30 is opened, whereby the container 35 will be placed under vacuum. The steam then formed will be sucked into the treating receptacle through the pipe 31, said steam being then superheated in the receptacle on account of the higher temperature therein. Through the powerful stirring produced upon the rotation of the shaft and the arms carried thereby, and particularly on account of the film produced when the arms are raised out of the mass, the steam will be brought into an exceedingly intimate contact with the mass which is thus purified from the non-desirable, taste-impairing organic substances occurring therein. The steam having been condensed in the condenser 41, the contaminated liquid enters the box 42 and will then flow down the pipe 50, whereby a quantity of liquid corresponding to the condensate will flow out of the container 52. When the treatment has proceeded for a sufficiently long time, the valves 30, 51, 47 and 44 are closed, whereupon the valve 48, 45 and 25 are opened, so that a pressure above atmospheric is produced. The mass will then be pressed through the pipe conduit 26 into the container 27, which should also be adapted to be heated, and may then be removed through the pipe 29.

Obviously, the method and apparatus may be varied in many respects, without departing from the basic principle of the invention. Thus a number of valves may be replaced by two-way and three-way valves or non-return valves.

What I claim is:

1. Method of removing the non-desirable, taste-impairing organic substances contained in the cacao bean, characterized by blowing superheated steam of a pressure below atmospheric through a heated mass of ground cacao unmixed with other substances.

2. Method according to claim 1, wherein the cacao mass is subjected to vacuum before the steam is admitted.

3. Method according to claim 1, wherein ground cacao in the form of a liquid mass is subjected to treatment.

4. Method according to claim 1, wherein ground cacao in a solid coarse-grained state, is subjected to treatment.

5. Method according to claim 1, wherein the cacao mass is treated at a temperature of 60–130 degrees centigrade.

6. Method according to claim 1, wherein the cacao is treated with superheated steam at a pressure below atmospheric of 600–760 millimeters.

7. Method according to claim 1, wherein the cacao mass is powerfully stirred during the treatment with steam.

8. Method according to claim 1, wherein ground cacao in the form of a thin layer or film is treated by the superheated steam.

OLOF EDWIN WIDÉN.

REFERENCES CITED

The following references are of record in the file of this patent:

UNITED STATES PATENTS

| Number | Name | Date |
|---|---|---|
| 1,004,870 | Greiser | Oct. 3, 1911 |
| 1,167,956 | Walker | Jan. 11, 1916 |
| 1,173,873 | Savy | Feb. 29, 1916 |
| 1,243,244 | Bladen | Oct. 16, 1917 |
| 2,070,558 | Beck | Feb. 16, 1937 |
| 2,071,393 | Doherty | Feb. 23, 1937 |
| 2,147,184 | Aasted | Feb. 14, 1939 |
| 2,278,483 | Plews | Apr. 7, 1942 |

FOREIGN PATENTS

| Number | Country | Date |
|---|---|---|
| 12,611 | Australia | 1928 |